Nov. 12, 1940.      D. A. PACK      2,221,220
METHOD AND MACHINE FOR FREEZING EDIBLE PRODUCTS
Filed June 16, 1939      3 Sheets-Sheet 1
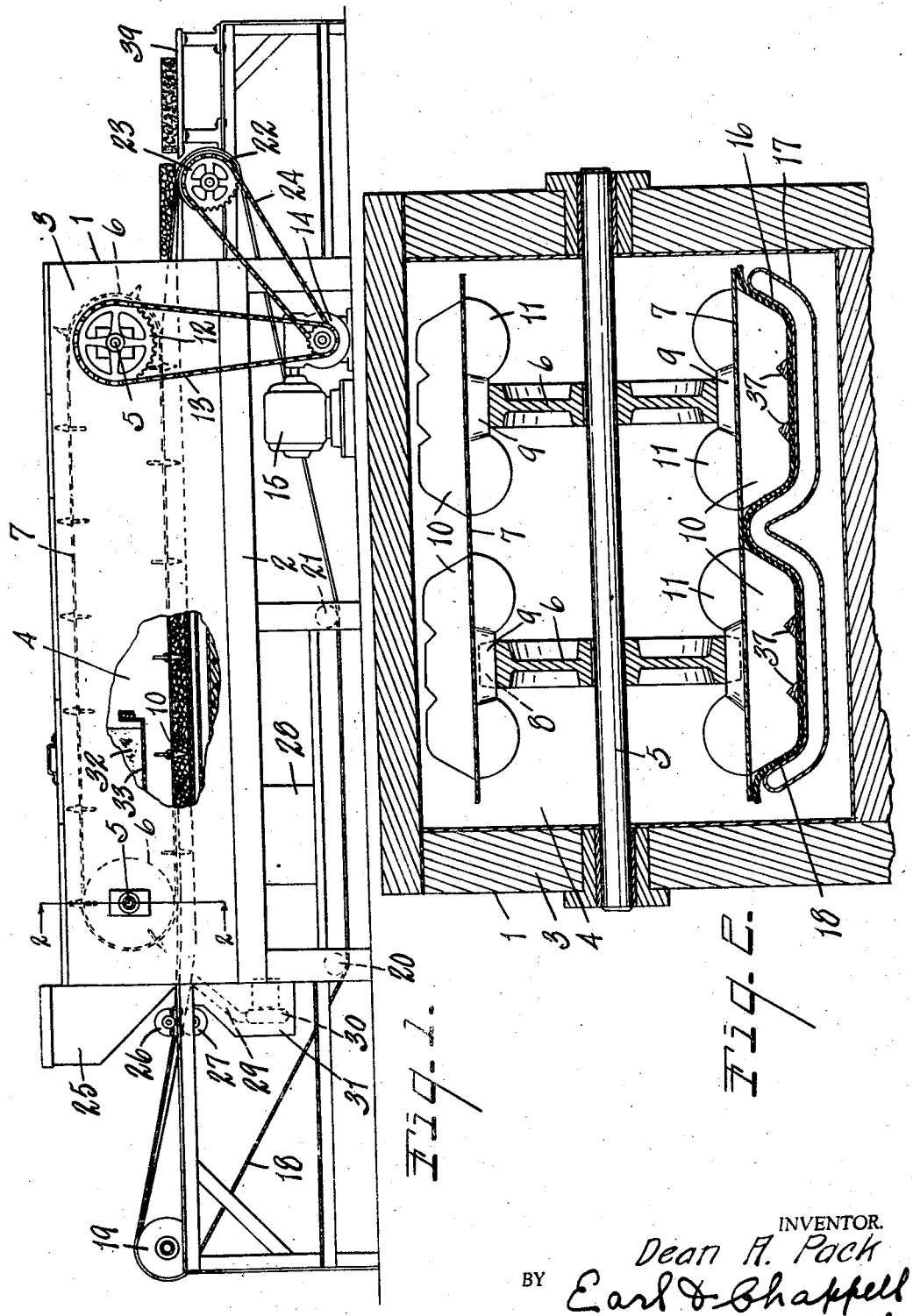
INVENTOR.
Dean A. Pack
BY Earl D. Chappell
ATTORNEYS Nov. 12, 1940.   D. A. PACK   2,221,220
METHOD AND MACHINE FOR FREEZING EDIBLE PRODUCTS
Filed June 16, 1939   3 Sheets-Sheet 2

INVENTOR.
Dean A. Pack
BY Earl & Chappell
ATTORNEYS

Nov. 12, 1940.  D. A. PACK  2,221,220

METHOD AND MACHINE FOR FREEZING EDIBLE PRODUCTS

Filed June 16, 1939  3 Sheets-Sheet 3

INVENTOR.
Dean A. Pack
BY Earl D. Chappell
ATTORNEYS

Patented Nov. 12, 1940

2,221,220

UNITED STATES PATENT OFFICE 2,221,220

METHOD AND MACHINE FOR FREEZING EDIBLE PRODUCTS

Dean A. Pack, Battle Creek, Mich.

Application June 16, 1939, Serial No. 279,387

18 Claims. (Cl. 62—114)

The main objects of my invention are:

First, to provide a novel method of quickly refrigerating or freezing edible products.

Second, to provide a machine for performing the aforesaid method and capable of freezing the products loosely or of freezing more or less fluent products into rigid block mass.

Third, to provide a process and machine of the type described in which the freezing operation is continuous.

Fourth, to provide a machine for quickly freezing edible products in any desired form or cross section for packaging as desired.

Fifth, to provide a machine for continuously conveying edible products through a freezing chamber or compartment, subjecting the products therein to a freezing atmosphere on all sides thereof, and simultaneously forming and partially subdividing the same whereby when discharged the frozen product will be in desired size and outline for packaging.

Further objects relating to details and economies of my invention will definitely appear from the description to follow. The invention is defined in the claims.

A structure embodying the features of my invention is illustrated in the accompanying drawings wherein:

Fig. 1 is a view in side elevation of the machine of my invention, being partially broken away and in vertical longitudinal section.

Fig. 2 is an enlarged fragmentary view in transverse vertical section on line 2—2 of Fig. 1, illustrating details of construction of the machine.

Figure 3:
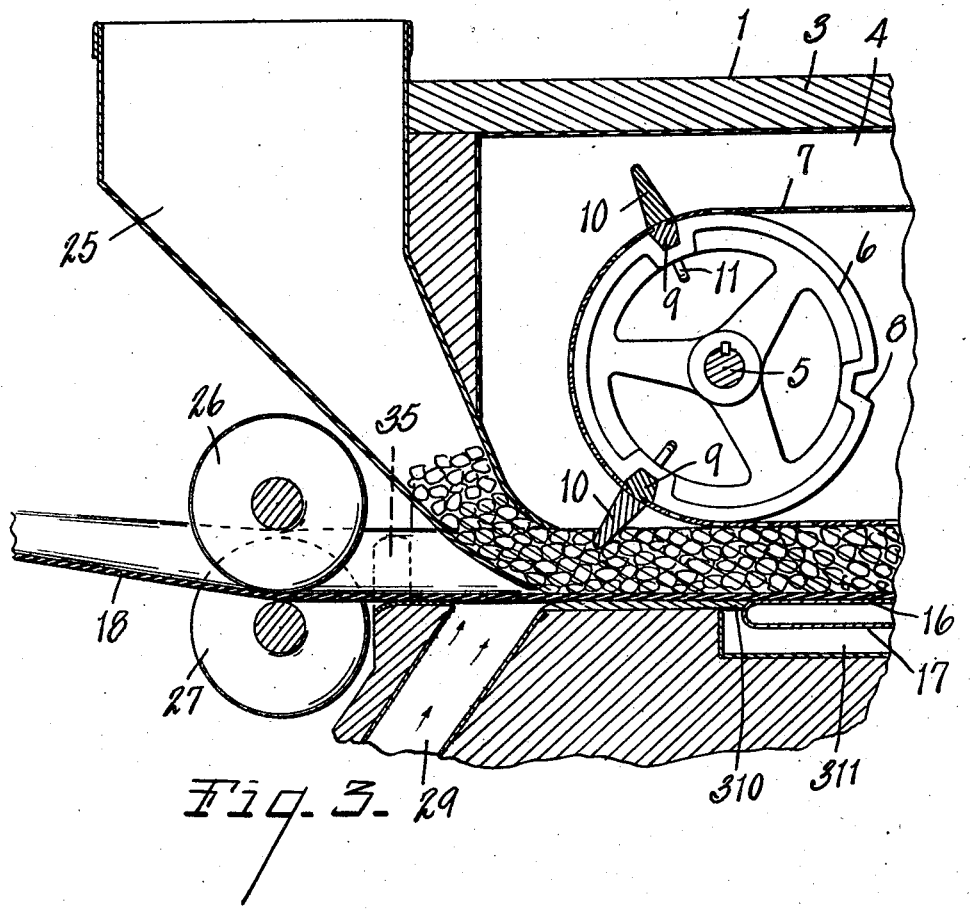
Fig. 3 is an enlarged fragmentary view in longitudinal vertical section illustrating details of construction at the entrance or charging end of the machine.

Referring to the drawings, the reference numeral 1 in general indicates the machine of my invention which consists of a suitably supported elevated base or table 2 upon which is mounted an elongated well insulated freezing housing 3 enclosing the freezing chamber 4. This chamber 4 has rotatably journaled therein a pair of shafts 5 upon which are keyed the belt driving wheels 6, there being a pair of the said wheels on each shaft. The construction of these wheels is clearly indicated in Figs. 3 and 4. They are adapted to have trained about them a flexible metal belt 7 of foraminated or wire construction or of other material or construction rendering the same sufficiently light though sufficiently strong and well adapted for the transmission or conduction of heat. The wheels 6 have circumferentially spaced recesses 8 therein adapted to receive the driving lugs 9 of the charge subdividing elements or flights 10 carried by belt 7, there being guide elements or ears 11 also secured to these flights to guide the driving lugs into recesses 8. One of the shafts 5 is driven by a sprocket 12 secured thereto and a drive chain 13 which is in turn driven from a suitable reduction gearing device 14 connected to a motor 15. In such manner the belt 7 and flights thereon are caused to travel slowly in an orbital path about the wheels 6 within the freezing chamber 4.

Figure 5:
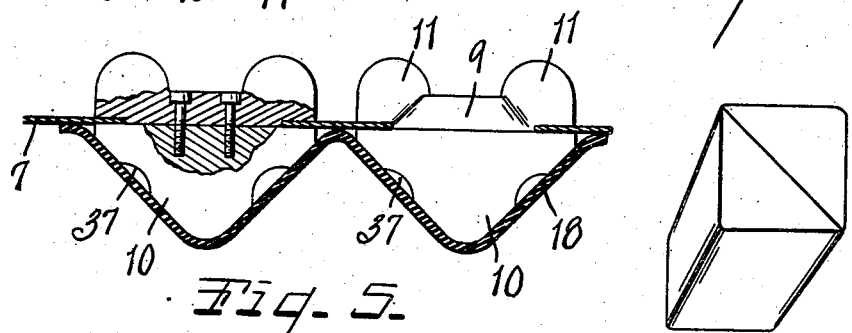
Fig. 5 is a fragmentary detail view partially broken away and in transverse vertical section illustrating one form of product conveying trough and charge subdividing elements adapted for use in my invention.
Figure 6:
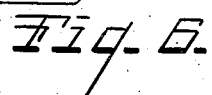
Fig. 6 is a perspective view illustrating a pair of food product units or charge produced by the construction of Fig. 5 and assembled in compact complementary relation for packaging.
Figure 7:
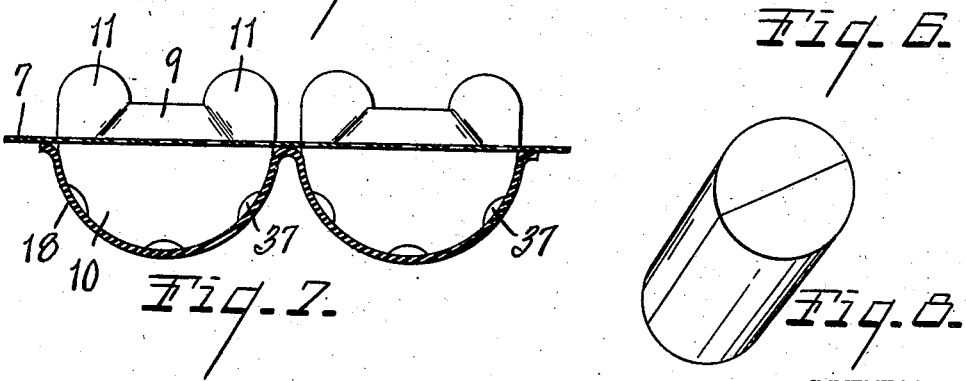
Fig. 7 is a view similar to Fig. 5 illustrating a slightly different form of food product forming conveyor.
Figure 8:
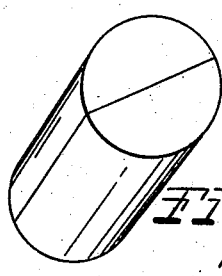
Fig. 8 is a view similar to Fig. 6 illustrating a pair of units produced by the trough of Fig. 7 assembled for packaging.

Adjacent the bottom of the freezing chamber I provide a pair of longitudinally extending fixed freezing, guiding, and supporting troughs generally designated 16 which are preferably defined by a hollow elongated sheet metal refrigerating element 17 adapted to have brine or other suitable refrigerant circulated therethrough. This element is conformed to provide a pair of parallel fixed troughs similar in cross sectional outline to the desired cross section of the final frozen product. Of course, this cross section may be varied as desired. In Figs. 2, 5, and 7, I illustrate different outlines which may be employed, the latter two figures omitting the fixed troughs themselves but clearly designating the shape in which the same are to be formed to produce the respective products illustrated in Figs. 6 and 8. These fixed refrigerating troughs serve as guides to receive and shape the flexible and longitudinally movable food product conveying trough 18 to be hereinafter described. Each of the embodiments illustrates an adaptation of a pair of the said troughs arranged in parallel relation;

however, it will be appreciated that the number of the troughs may be varied as desired to increase or diminish the output of the machine.

The aforesaid fixed freezing troughs 16 receive and guide the movable food product conveying trough 18 which is fashioned from an imperforate relatively thin and flexible water proof smooth heat-conducting material and is intended to be drawn over the refrigerating surface of the troughs 16, carrying the food product deposited on the moving trough through the freezing chamber. Although various materials will at once suggest themselves from which member 18 might be made, I prefer that the conveying trough shall be, in case an inexpensive disposable one is desired, a waxed or parchmentized paper, or in case a permanent re-usable trough is desired, a rubber sheet or web in endless form is well suited for my purpose. Either of these materials is well adapted for the transmission of heat from the food product in freezing, is impermeable to juices and moisture in case the product is frozen as a mass with a liquid binding agent or juice, is readily conformable to the proper transverse shape or section, and will not stick or freeze to the refrigerating surface of the fixed troughs 16 so as to prevent its movement thereover.

In Fig. 1 I have illustrated an installation in which a permanent rubber movable or charge conveying trough 18 is employed, being trained over guide rollers 19, 20, 21 and 22 journaled in the frame of the machine, the latter of which is positively driven through a sprocket 23 and a chain 24 driven from the reduction gearing 14 in such manner that the speed of the belt 7 and the movable food conveyor trough is equal.

Figure 4:
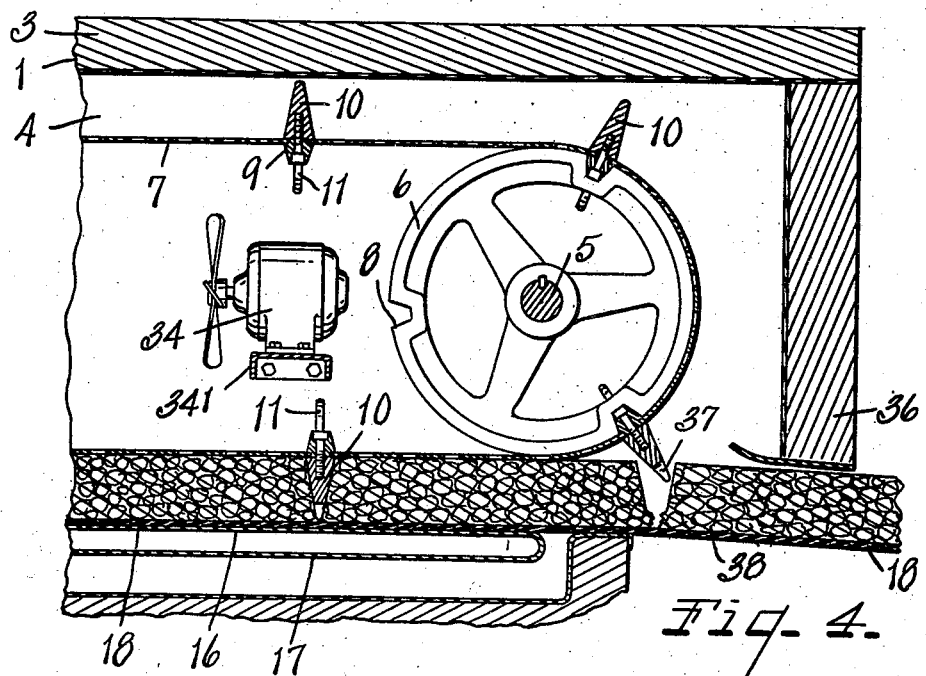
Fig. 4 is an enlarged fragmentary view in longitudinal vertical section at the exit or discharge end of the machine.

The said movable trough travels through the freezing chamber 4 in parallelism with the belt 7, the charge subdividing elements or flights 10 on the latter being shaped to correspond to the outline of the guide troughs 16 and coacting with the movable trough 18 supported thereon to define a number of successive charge receiving compartments into which the food which is to be frozen is fed from a measuring hopper 25 at the charging or left hand end of the machine as illustrated in Figs. 1 and 3.

To reduce friction attending movement of the trough 18 I propose to initially conform the latter to corespond to the outline of the fixed troughs 16, and to this end I provide a pair of coacting rollers 26, 27 appropriately journaled at the feed-in end of the machine between which the conveyor trough passes, as clearly illustrated in Fig. 3, these last named rollers being so formed as to engage the top and bottom of and initially shape the conveyor into conformity with the outline of fixed trough 16 so that the product in trough 18 is subjected to direct freezing action on all sides of the latter.

I preferably circulate a refrigerant such as brine through the hollow element 17 from a refrigerating unit 28 immediately beneath the bottom of the freezing chamber, although the particular connections have not been illustrated, in order to simplify the drawings, and I also prefer to initially cool the conveying trough 18 a substantial extent at the feed-in end of the machine in any suitable manner, preferably by forcing powdered or ground dry ice into engagement with the lower side thereof through an insulated passage 29 formed in or adjacent the housing at the lead-in end thereof, this refrigerating substance being supplied by a blower or other device 30, illustrated in Fig. 1 in dotted lines, located in a well insulated auxiliary housing 31. Thus the trough 18 is well cooled before the articles are placed therein without, however, being moistened so as to freeze and stick to trough 16. A plate 310 (see Fig. 3) beneath trough 18 permits sliding of the product or conveyor trough onto fixed trough 16. A suitable desiccating medium or dry ice may be placed in the space 311 beneath refrigerating element 17 to maintain the dry condition of the trough 18 throughout its travel.

A further refrigerating effect is provided above the product trough 18 by a non-liquescent freezing medium 32 such as dry ice supported on a shelf or grating 33 located between the opposed pairs of wheels 6 and between the edges of the lug carrying belt 7. The air in this space is blown past the refrigerant 32 by a motor driven fan 34, see Fig. 4, also suitably supported on a fixed shelf 341 and, so cooled, effects a ready heat transfer from the product on trough 18 through the flight carrying belt 7.

In order to prevent leakage of heat into the housing, I seal the same as closely as is possible and still permit entry of the product conveying trough 18 into the housing and exit of the said movable trough and frozen product. Thus, at the feed-in end of the machine, see Fig. 3, I provide an upwardly projecting dam 35 on the housing which is preferably shaped to engage the movable conveyor 18 beneath the same and prevent heat radiation into the chamber 4, also serving as a shaping member for the trough, while on the discharge side, see Fig. 4, I extend the end wall 36 downwardly as far as possible toward the frozen product emerging from the housing.

From the foregoing the operation of the machine should be apparent. A food product such as, for example, fruits, vegetables and the like (comminuted by slicing or shredding if necessary) is fed from hopper 25 onto the conveyor through trough 18, the amount fed being suitably proportioned to the shape and size of the troughs and to the speed thereof. The flights 10 passing over the left hand wheel, as viewed in Fig. 3, separate the charges into proper size and, with the moving conveyor trough 18, transport the same at desired speed through the freezing chamber 4, substantially dividing adjacent charges from one another. Preferably the flights 10 are provided with apertures or recesses 37 whereby the charges when frozen in a mass with a congealable binding material remain connected by sections of frozen material of small area. In such case the supporting floor 38 of the chamber is inclined downwardly or cut away at the discharge end of the machine, illustrated in Fig. 4, so as to cause a downward drop of a section being discharged from the chamber to fracture the connecting sections and separate the same from the following block-like charge.

The frozen products are pushed outwards onto a receiving table 39 from which they may be removed for packaging. It will be appreciated that a food product may also be frozen loosely, i. e., with a minimum amount of or no binding material rather than in a mass producing shaped block-like charges, in which case it may be placed in any shape of package. However, if frozen in a mass the shape of package will preferably be in accordance with the shape of the frozen block.

As pointed out above the food conveyor trough 18 is essentially characterized by smoothness, flexibility, liquid impermeability, and heat conductivity. Acting with the heat conductive belt 7 and flights 10, it is apparent that refrigeration of the product from all sides may readily take place during its continuous transportation through the freezing chamber. If desired, and as pointed out above, the aforesaid food conveyor trough 18 may be formed of a waxed or parchmentized paper and disposed of at the discharge side of the machine, in which case the belt guide roller 19 would be replaced by a suitable supply of the paper, the belt guide rolls 20, 21 and 22 would be omitted, and the forming rolls 26, 27 could be suitably driven so as to forward the sheet or web.

In some cases it may be desirable to apply a slight amount of heat to the discharge end of the machine adjacent supporting floor 38 to facilitate separation of the conveyor trough 18 from the frozen product, if such is necessary.

In whatever embodiment selected my invention primarily consists of a supporting and refrigerating element formed to provide a fixed, shaped guide trough and a movable heat transmitting food product trough guided and supported by the said fixed trough, the said movable trough coacting with a plurality of belt actuated or otherwise actuated flights to forward food charges deposited on the food trough through the freezing compartment and the charges issuing therefrom in finally shaped condition ready for packaging. In all cases the product is quickly and thoroughly frozen throughout due to the fact that heat is abstracted from all of the sides thereof during passage through the compartment, and particularly by reason of the heat conduction through the product shaping and conveying trough or web.

This concept permits the section of the products to be readily varied as desired by simply changing the shape of the trough 18 employed, using the same movable web 18. The process is a continuous one, involves no necessity for freezing with the product in the container, i. e., freezing through the containers, and, hence, is considerably quicker and cheaper, since less expensive containers may be used. Furthermore, juices, syrups, or liquids may be frozen as readily as solids, and products may be frozen loosely or in any desired more or less fluent binding solution or syrup. Thus, if it is wished to freeze an extremely liquid or fluent product or juice, dummy dams placed on the product trough may be employed, the charges of the product being suitably measured in hopper 25, or by using a leveling hopper, or by tilting the trough slightly to prevent rearward flow. These matters are merely refinements of my invention; hence, they have not been illustrated, in order to simplify the disclosure.

I have illustrated and described my invention in an embodiment which is very practical. I have not attempted to illustrate or describe other embodiments or adaptations as it is believed this disclosure will enable those skilled in the art to embody or adapt my invention as may be desired.

Having thus described my invention, what I claim as new and desire to secure by Letters Patent is:

1. A machine for freezing food products, comprising an elongated insulated freezing chamber having entrance and exit openings therein, a fixed hollow guide trough in said chamber extending longitudinally thereof and having an upper refrigerating surface shaped to correspond to the desired cross section of the frozen food product, means for cooling said surface including a refrigerant in said hollow trough, a belt-like movable food product trough adapted to pass through said chamber in sliding contact with said fixed trough, said food product trough comprising a flexible imperforate web of smooth heat transmitting waterproof material, means operative on said trough prior to entrance thereof into said chamber to conform the same to the outline of said fixed trough whereby the two troughs have intimate engagement throughout the contacting width thereof during their engagement in the chamber, means for depositing a food product to be frozen on said movable trough at the entrance side of said chamber, and means coacting with said movable trough for dividing and translating said food product through said chamber, comprising a flexible foraminate belt of heat transmitting material, and means for translating said belt at the same speed as said food product trough with the belt engaging the product from above, and spaced flights on said belt embedding themselves in said product and coacting with said movable trough to separate the product into individual charges and in case the product is frozen in a mass, for partially subdividing said charges whereby they may be readily fractured and separated, and refrigerating means disposed in said chamber for cooling said belt and food product from above.

2. A machine for freezing food products, comprising an elongated insulated freezing chamber having entrance and exit openings therein, a fixed guide trough in said chamber extending longitudinally thereof and having an upper refrigerating surface shaped to correspond to the desired cross section of the frozen food product, means for cooling said surface, a belt-like movable food product trough adapted to pass through said chamber in sliding contact with said fixed trough, said food product trough comprising a flexible imperforate web of smooth heat transmitting waterproof material, the two troughs having intimate engagement throughout the contacting width thereof during their engagement in the chamber, means for depositing a food product to be frozen on said movable trough at the entrance side of said chamber, and means coacting with said movable trough for dividing and translating said food product through said chamber, comprising a flexible belt, means for translating said belt at the same speed as said food product trough with the belt engaging the product from above, and spaced flights on said belt embedding themselves in said product and coacting with said movable trough to separate the product into individual charges and, in case the product is frozen in a mass, for partially subdividing said charges, whereby they may be readily fractured and separated, and refrigerating means disposed in said chamber for cooling said food product from above.

3. A machine for refrigerating food products, comprising an elongated insulated freezing chamber having entrance and exit openings therein, a fixed guide trough in said chamber extending longitudinally thereof and having a refrigerating surface shaped to correspond to the cross section of the frozen food product, means for cooling said surface, a flexible movable food product trough adapted to pass through said chamber in sliding contact with said fixed trough, said food product trough comprising a web of smooth imperforate waterproof material adapted to have a food product, moist or otherwise, deposited directly thereon, said two troughs having intimate heat transmitting engagement throughout the width thereof during their sliding contact in the chamber, means for depositing a food product to be frozen on said movable trough at the entrance side of said chamber, and means movable with said movable trough and coacting therewith for subdividing said product into charges and for translating said charges through said chamber, and refrigerating means disposed in said chamber for cooling said food product from above.

4. A machine for refrigerating food products, comprising an elongated insulated freezing chamber having entrance and exit openings therein, a fixed guide trough in said chamber extending longitudinally thereof and having a refrigerating surface shaped to correspond to the cross section of the frozen food product, means for cooling said surface, a flexible movable food product trough adapted to pass through said chamber in sliding contact with said fixed trough, said food product trough comprising a web of smooth imperforate waterproof material adapted to have a food product, moist or otherwise, deposited directly thereon, said two troughs having intimate heat transmitting engagement throughout the width thereof during their sliding contact in the chamber, means for depositing a food product to be frozen on said movable trough at the entrance side of said chamber, and refrigerating means disposed in said chamber for cooling said food product from above.

5. Apparatus for freezing products, comprising an elongated refrigerating and guiding trough of cross section corresponding approximately to the desired cross sectional area of the final frozen product, a flexible imperforate food transporting member of moisture-proof material adapted to transport said product, said member having sliding engagement with said food trough, means for conforming said member to correspond to the outline of said trough whereby said member engages said trough throughout the area of contact therewith in heat conducting relation thereto, means for charging a product to be frozen on said member, and means engageable with the product on the member and movable with said member to separate the product into measured charges, and means for refrigerating said trough to withdraw heat from the product.

6. A machine for quickly freezing edible products, comprising a freezing chamber, a refrigerated forming surface therein having a sectional outline corresponding to the cross section of the final frozen product, means for maintaining the surface of said forming element in refrigerated condition, a heat conductive, fluid impervious food transporting web adapted to move through said chamber in heat transmitting contact with said surface and having a food product to be frozen deposited directly thereon for transportation through the chamber, said web conforming to the outline of said formed surface throughout the area of its contact therewith in said chamber, means for directing a non-liquescent refrigerating medium against said web on the opposite side thereof from said food product prior to deposition of the product thereon, means for actuating said web through the chamber, and means movable in synchronism with said web to subdivide the food product deposited thereon into individual charges.

7. A machine for quickly freezing products, comprising a freezing chamber, a refrigerated forming surface therein having a sectional outline corresponding to the cross section of the final frozen product, means for maintaining the surface of said forming element in refrigerated condition, a heat conductive, fluid impervious transporting web adapted to move through said chamber in heat transmitting contact with said surface and having a product to be frozen deposited directly thereon for transportation through the chamber, said web conforming to the outline of said formed surface throughout the area of its contact therewith in said chamber, means for refrigerating said web on the opposite side thereof from said product prior to deposition of the product thereon, and means for actuating said web through the chamber.

8. A machine for quickly refrigerating products, comprising a freezing chamber, a sheet metal forming surface therein having a sectional outline corresponding to the cross section of the final frozen product, means for maintaining the surface of said forming element in refrigerated condition, a fluid impervious, flexible and heat conductive product transporting web adapted to move through said chamber and to have a product to be frozen deposited directly thereon for transportation through the chamber, and means for actuating said web through the chamber in sliding engagement with said forming surface throughout the entire effective product supporting width of the web, whereby the web is conformed to the outline of the forming surface and the product on the web is quickly cooled by conduction through the web.

9. In a structure of the class described, the combination of a freezing chamber, a flexible feed conveyor for products to be refrigerated, a refrigerating unit constituting a support for the forwardly advancing reach of said conveyor while passing through the refrigerating chamber, said support having a cross sectional upper surface shape corresponding to the desired shape of the product, feed means for introducing the product to be refrigerated to said conveyor, means acting on the conveyor in advance of the point of delivery of the food product to preliminarily shape the conveyor, and a coacting conveyor means disposed to have one reach thereof travel in parallel relation to the feed conveyor and constituting a forming element for the upper side of the refrigerated product, said coacting conveyor being provided with shaped flights acting as means facilitating the dividing of the product into sections.

10. In a structure of the class described, the combination of a freezing chamber, a flexible feed conveyor for products to be refrigerated, a refrigerating unit constituting a support for the forwardly advancing reach of said conveyor while passing through the refrigerating chamber, said support having a cross sectional upper surface shape corresponding to the desired shape of the product, feed means for introducing the product to be refrigerated to said conveyor, and a coacting conveyor means disposed to have one reach thereof travel in parallel relation to the feed conveyor and constituting a forming element for the upper side of the refrigerated product, said coacting conveyor being provided with shaped flights acting as means facilitating the dividing of the product into sections.

11. In a structure of the class described, the combination of a freezing chamber, a flexible feed conveyor for products to be refrigerated, a refrigerating unit constituting a support for the forwardly advancing reach of said conveyor while passing through the refrigerating chamber, feed means for introducing the product to be refrigerated to said conveyor, and a coacting conveyor means disposed to have one reach thereof travel in parallel relation to the feed conveyor and constituting a forming element for the upper side of the refrigerated product.

12. In a structure of the class described, the combination of a freezing chamber, a flexible feed conveyor for products to be refrigerated, a refrigerating unit constituting a support for the forwardly advancing reach of said conveyor while passing through the refrigerating chamber, and a coacting conveyor means disposed to have one reach thereof travel in parallel relation to the feed conveyor and constituting a forming element for the upper side of the refrigerated product, said coacting conveyor being provided with flights acting as means facilitating the dividing of the product into sections.

13. In a structure of the class described, the combination of a freezing chamber, a flexible feed conveyor for products to be refrigerated, a refrigerating unit constituting a support for the said feed conveyor while passing through the refrigerating chamber, said support having a cross sectional supporting surface shape corresponding to the desired shape of the product, a coacting conveyor means constituting a forming element for the one side of the product refrigerated, and provided with flights acting as means facilitating the dividing of the product into sections.

14. The method of freezing food products such as fruits, vegetables and the like, either loosely or in a mass with a binding material, comprising depositing the product on a conveyor simultaneously translating and forming the conveyor with the product thereon by passing the conveyor in intimate, sliding and heat conducting relation to a form shaped to correspond to the desired form of the final frozen product, refrigerating said form during said translation and forming, whereby to abstract heat from the product through the conveyor and form, and subdividing the product into charges and subjecting the product to a refrigerating atmosphere on the side thereof opposite the conveyor during said translation.

15. The method of freezing food products comprising depositing the product on a conveyor, forming the conveyor to the desired form of the final frozen product, translating the conveyor with the product thereon in sliding heat conducting relation to a source of refrigeration whereby to abstract heat from the product through the conveyor, and subjecting the product to a refrigerating atmosphere on the side thereof opposite the conveyor during said translation.

16. The method of freezing food products including a substantial amount of liquid binding material, comprising depositing the product on a containing and transporting member incapable of absorbing the binder, translating the product and container through a refrigerating atmosphere while conforming the member and product therein to the desired final shape of the product, subdividing said product into individual charges, and effecting a heat transfer from said product by conduction through said member during translation and forming of the latter.

17. The method of freezing food products comprising depositing the product on a containing and transporting member, translating the product and container through a refrigerating atmosphere while conforming the member and product therein to the desired final shape of the frozen product, and effecting a heat transfer from said product by conduction through said member during translation and forming of the latter.

18. The method of freezing food products including thhe steps of translating the product through a refrigerating chamber while supported upon a flexible element, the flexible element in its turn being supported upon a refrigerating unit, the supporting surface of which is conformed in cross section to the desired shape of the frozen product, subjecting the product while being translated along upon said flexible element to the action of a second forming element traveling at the same rate of speed as the flexible supporting element to divide the product on said flexible supporting element into sections prior to its becoming solidified in the refrigerating chamber.

DEAN A. PACK.